US008874743B1

(12) United States Patent
Heidelberger et al.

(10) Patent No.: US 8,874,743 B1
(45) Date of Patent: *Oct. 28, 2014

(54) SYSTEMS AND METHODS FOR IMPLEMENTING DYNAMIC SUBSCRIBER INTERFACES

(75) Inventors: Gregory Heidelberger, Wakefield, MA (US); Brian Sullivan, Lexington, MA (US); Mathias Kokot, Medford, MA (US); Dan Bergman, Brookline, MA (US); Eric Peterson, Westford, MA (US); Jeelani Syed, Lowell, MA (US); Prasad Deshpande, Framingham, MA (US); Ryan Ross, Westford, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 727 days.

This patent is subject to a terminal disclaimer.

(21) Appl. No.: 12/475,267

(22) Filed: May 29, 2009

Related U.S. Application Data

(63) Continuation of application No. 10/429,781, filed on May 6, 2003, now Pat. No. 7,558,844.

(51) Int. Cl.
*G06F 15/16* (2006.01)
*G06F 15/173* (2006.01)
*G06F 15/177* (2006.01)

(52) U.S. Cl.
USPC ............................ 709/226; 709/224; 370/352

(58) Field of Classification Search
CPC .................... H04L 12/2876; H04L 29/12226; H04L 61/2015
USPC ................... 709/217–228, 200–203; 370/352
See application file for complete search history.

(56) References Cited

U.S. PATENT DOCUMENTS

| | | | |
|---|---|---|---|
| 6,335,927 B1 | 1/2002 | Elliott et al. | |
| 6,466,976 B1 | 10/2002 | Alles et al. | |
| 6,850,495 B1 | 2/2005 | Baum et al. | |
| 6,917,617 B2* | 7/2005 | Jin et al. | 370/395.21 |
| 6,952,728 B1 | 10/2005 | Alles et al. | |
| 7,039,037 B2* | 5/2006 | Wang et al. | 370/349 |
| 7,136,374 B1 | 11/2006 | Kompella | |
| 7,149,223 B2 | 12/2006 | Liva et al. | |
| 7,185,106 B1 | 2/2007 | Moberg et al. | |
| 7,197,549 B1* | 3/2007 | Salama et al. | 709/223 |
| 7,283,536 B2* | 10/2007 | Ruutu et al. | 370/400 |
| 7,310,332 B2 | 12/2007 | Kadambi et al. | |
| 7,313,611 B1* | 12/2007 | Jacobs et al. | 709/223 |
| 7,319,691 B2 | 1/2008 | Qing et al. | |
| 7,356,609 B1 | 4/2008 | Allam et al. | |
| 7,363,353 B2 | 4/2008 | Ganesan et al. | |
| 7,408,940 B2* | 8/2008 | Jin et al. | 370/395.21 |
| 7,558,844 B1* | 7/2009 | Heidelberger et al. | 709/220 |
| 2002/0009092 A1 | 1/2002 | Seaman et al. | |
| 2002/0023174 A1* | 2/2002 | Garrett et al. | 709/245 |
| 2002/0027906 A1 | 3/2002 | Athreya et al. | |
| 2002/0052915 A1 | 5/2002 | Amin-Salehi | |
| 2002/0067725 A1* | 6/2002 | Oguchi et al. | 370/390 |
| 2002/0161884 A1* | 10/2002 | Munger et al. | 709/224 |
| 2002/0188720 A1* | 12/2002 | Terrell et al. | 709/225 |

(Continued)

*Primary Examiner* — Haresh N Patel
(74) *Attorney, Agent, or Firm* — Harrity & Harrity, LLP

(57) ABSTRACT

Dynamic subscriber interfaces in a network device are provided. An input port receives data units from multiple subscribers. A primary interface extracts source identifiers from headers associated with the received data units and creates dynamic subscriber interfaces to allocate network device resources to each of the multiple subscribers based on the extracted source identifiers.

20 Claims, 8 Drawing Sheets

(56) References Cited

U.S. PATENT DOCUMENTS

| | | |
|---|---|---|
| 2003/0035409 A1* | 2/2003 | Wang et al. ............... 370/349 |
| 2003/0039210 A1* | 2/2003 | Jin et al. ............... 370/229 |
| 2003/0112755 A1* | 6/2003 | McDysan ............... 370/230 |
| 2003/0117954 A1 | 6/2003 | De Neve et al. |
| 2003/0195946 A1 | 10/2003 | Yang |
| 2003/0208609 A1 | 11/2003 | Brusca |
| 2003/0227876 A1* | 12/2003 | Ruutu et al. ............... 370/252 |
| 2004/0090923 A1 | 5/2004 | Kan et al. |
| 2004/0215877 A1 | 10/2004 | Chatterjee et al. |
| 2004/0261116 A1* | 12/2004 | Mckeown et al. ............ 725/109 |
| 2005/0111360 A1* | 5/2005 | Jin et al. ............... 370/229 |
| 2006/0174035 A1 | 8/2006 | Tufail |
| 2008/0114887 A1 | 5/2008 | Bryers et al. |
| 2008/0133734 A1* | 6/2008 | Jacobs et al. ............... 709/223 |

* cited by examiner

SYSTEMS AND METHODS FOR IMPLEMENTING DYNAMIC SUBSCRIBER INTERFACES This application is a continuation of U.S. patent application Ser. No. 10/429,781, filed May 6, 2003, now U.S. Pat. No. 7,558,844, the contents of which are incorporated herein by reference.

BACKGROUND OF THE INVENTION

1. Field of the Invention

The present invention relates generally to networks, and more particularly, to systems and methods for implementing dynamic subscriber interfaces in such networks.

2. Description of Related Art

In many networks, subscribers to network services, such as, for example, cable network services, can be aggregated into a shared medium, such as, for example, gigabit Ethernet, to provide specified services to the subscribers. To provide differentiated services for each subscriber, a service provider may pre-configure the allocation of resources based on the static Internet Protocol (IP) address associated with each subscriber. However, since re-usable address pools are typically used in such networks, such a static allocation of resources would be highly wasteful of network resources. The static allocation of resources to subscribers would also make standard industry practices, such as service over-subscription, impracticable, since not enough resources would be available to allocate to all possible subscribers. Additionally, even assuming enough resources could be made available to statically allocate resources to all subscribers, the sheer volume of allocated resources would ensure that managing the resources would be an overwhelming task, especially considering that only a small fraction of the configured subscribers would ever be using the system at the same time.

Therefore, there exists a need for systems and methods that can dynamically allocate resources to network service subscribers in a network device.

SUMMARY I/F THE INVENTION

Systems and methods consistent with the principles of the invention address this and other needs by implementing dynamic subscriber interfaces in a network device. The dynamic subscriber interfaces may allocate network resources so as to provide differentiated services to the different subscribers of the network service. When a first data unit is received from a subscriber, a primary interface may extract a source identifier from the data unit. The primary interface may create a subscriber interface to process data units received from the subscriber, and may insert the source identifier into a table, along with a pointer to the created subscriber interface. The created subscriber interface may process the subsequent data units until the subscriber logs off and the subscriber interface is removed to de-allocate network resources.

One aspect consistent with principles of the invention is directed to a method of providing dynamic subscriber interfaces in a network device. The method includes extracting source identifiers from headers of data units received from multiple subscribers. The method further includes dynamically configuring subscriber interfaces to allocate network device resources to the subscribers based on the extracted source identifiers.

A second aspect consistent with principles of the invention is directed to a method for dynamically configuring a subscriber interface at a network device. The method includes creating a subscriber interface to allocate resources to a network service subscriber when a data unit with a new source identifier is received. The method further includes removing the subscriber interface to de-allocate resources to the network service subscriber when the subscriber logs off of the network service.

BRIEF DESCRIPTION I/F THE DRAWINGS

The accompanying drawings, which are incorporated in and constitute a part of this specification, illustrate exemplary embodiments of the invention and, together with the description, explain the invention. In the drawings, FIG. 1 is a diagram of an exemplary network consistent with the principles of the invention;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention include mechanisms for implementing subscriber interfaces. The implemented subscriber interfaces, consistent with the principles of the invention, dynamically allocate network resources so as to provide differentiated services to the different subscribers of a network service.

Exemplary Network

Figure 1:
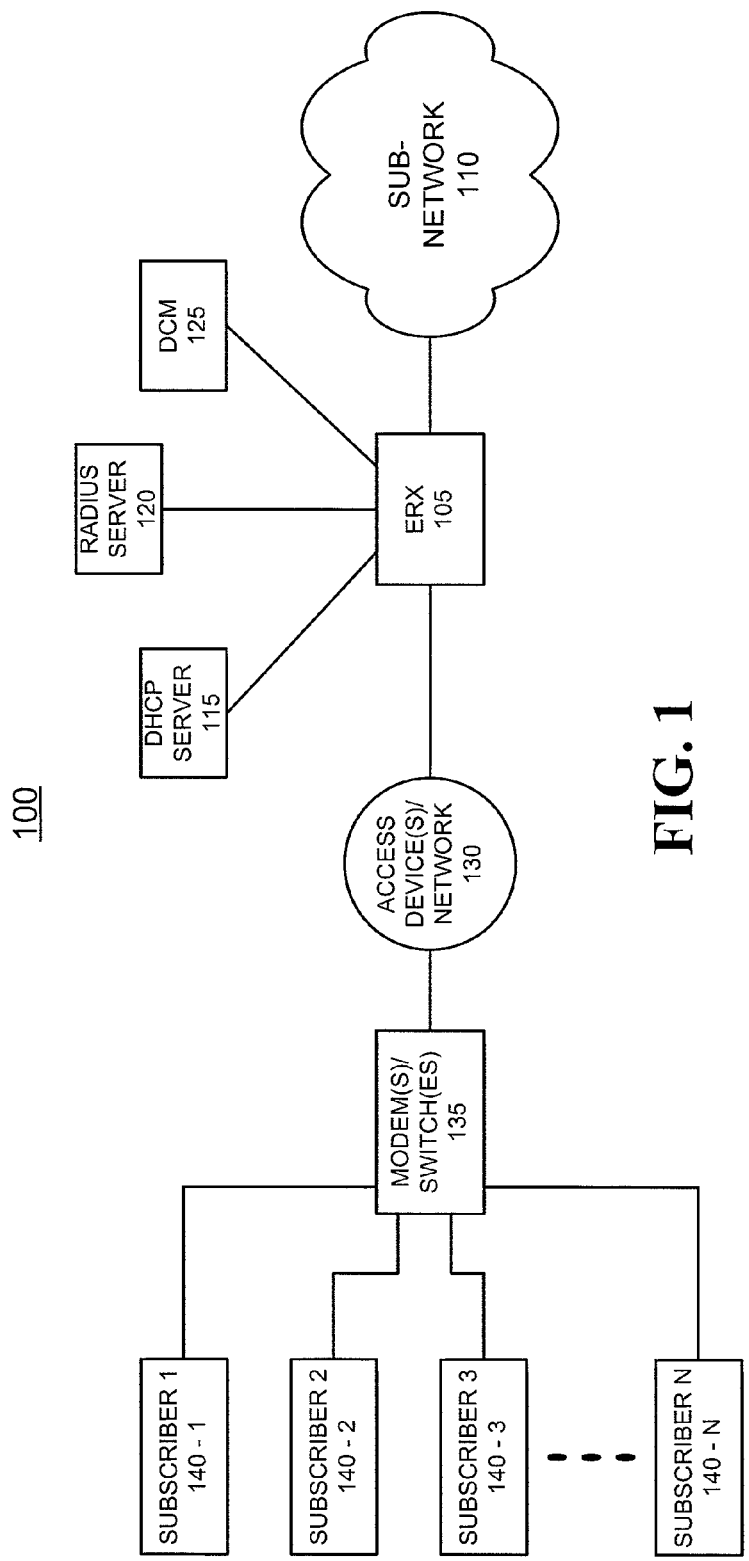

FIG. 1 illustrates an exemplary network 100 in which systems and methods, consistent with the present invention, may implement dynamic subscriber interfaces. Network 100 may include an edge router (ERX) 105, a sub-network 110, a dynamic host configuration protocol (DHCP) server 115, a remote authentication dial in user service (RADIUS) server 120, a dynamic configuration manager (DCM) 125, an access device(s)/sub-network 130, a modem(s)/switch(es) 135 and one or more subscribers (subscribers 145-1 through 145-N shown by way of example). ERX 105 may include conventional circuitry for encoding and decoding data units transmitted to and from sub-network 110 and subscribers 145-1 through 145-N (collectively referred to as subscribers 145). Sub-network 110 may include one or more networks of any type, including, for example, a Public Switched Telephone Network (PSTN), local area network (LAN), a metropolitan area network (MAN), a satellite network, a cable network, an Internet or intranet. Sub-network 110 may include, for example, an incumbent local exchange carrier (ILEC) network, an Internet Service Provider (ISP) network, or a wireless LAN provider network.

DHCP server 115 may assign source identifiers, such as, for example, IP addresses in networks using IP, to network service subscribers. RADIUS server 120 may perform subscriber authentication services. DCM 125 may control the creation of subscriber interfaces in ERX 105. Modem(s)/switch(es) 135 may include a number of different devices for interconnecting subscribers with access device(s)/network 130. Such devices may include cable modems, digital subscriber line modems, or layer 2 switches. Access device(s)/network 130 may include a cable modem termination system (CMTS), a digital subscriber line access multiplexer (DSLAM), a layer 2 switch or a wireless LAN local provider access network. Each of subscribers 145-1 through 145-N may include a host.

If sub-network 110 includes a cable network, then access device(s)/network 130 may include one or more cable modem termination systems and modem(s)/switch(es) 135 may include one or more cable modems. In one embodiment, in which network 110 includes an incumbent local exchange carrier (ILEC) network, access device(s)/network 130 may include a digital subscriber line access multiplexer and modem(s)/switch(es) 135 may include a DSL modem. In another embodiment in which network 110 includes an ILEC network, access device(s)/network 130 may include a layer 2 switch and modem(s) switch(es) 135 may include one or more layer 2 switches.

If sub-network 110 includes an ISP network, then access device(s)/network 130 may include a local wireless provider access network and modem(s)/switch(es) 135 may include layer 2 transport devices and wireless access points. If sub-network 110 includes a wireless provider network, then access device(s)/network 130 may include a DSLAM and modem(s)/switch(es) 135 may include one or more DLS modems interconnected with wireless access points.

It will be appreciated that the number of elements illustrated in FIG. 1 are provided for explanatory purposes only. A typical network may include more or fewer elements than are illustrated in FIG. 1 and may be configured differently. For example, ERX 105 may access DHCP server 115, RADIUS server 120 and DCM 125 over a network.

Exemplary ERX

Figure 2:
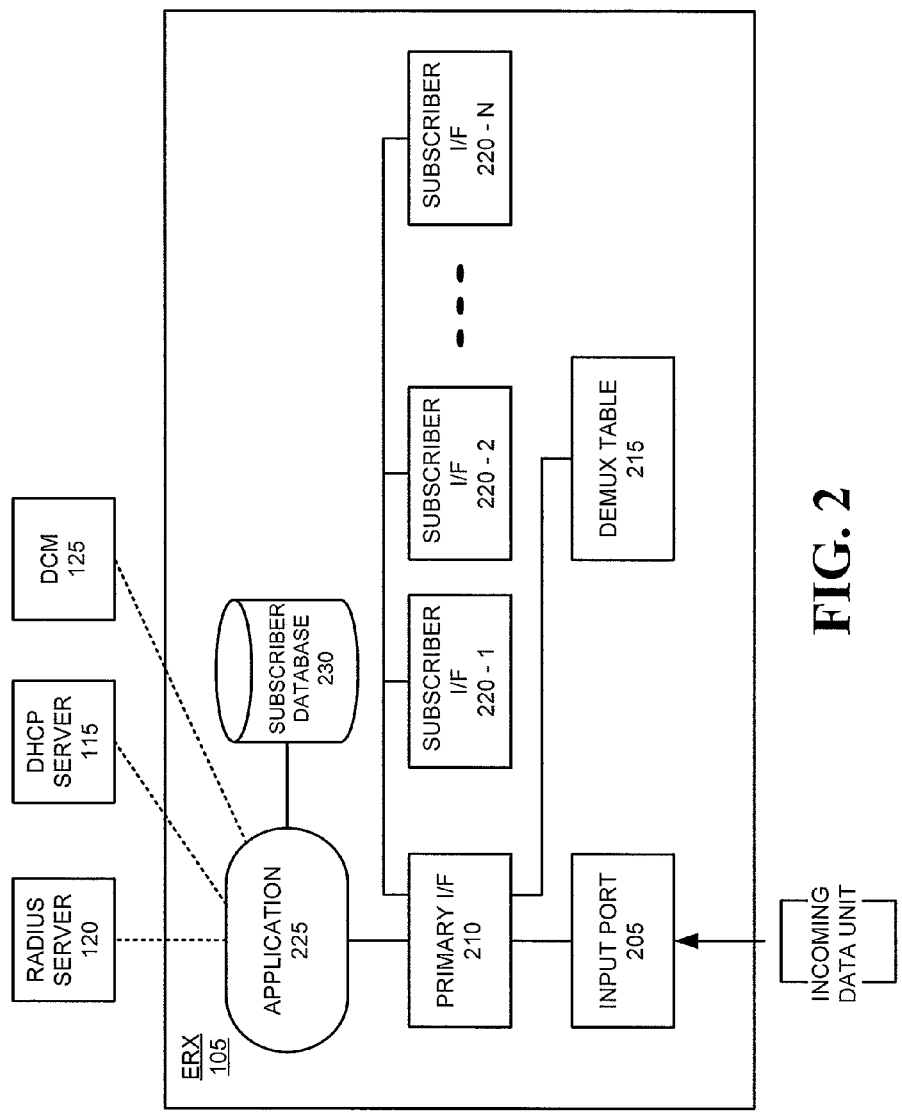
FIG. 2 is a diagram of an exemplary edge router consistent with the principles of the invention.

FIG. 2 illustrates exemplary components of ERX 105 consistent with the principles of the invention. ERX 105 may include an input port 205, a primary interface (I/F) 210, a demultiplexing (demux) table 215, one or more subscriber I/Fs 220-1 through 220-N (collectively referred to as subscriber I/Fs 220), an application 225 and a subscriber database 230. Input port 205 may receive an incoming data unit (e.g., any type of encapsulated data, including, for example, packets, cells, datagrams, fragments of packets, or fragments of datagrams, packets or cells). Primary I/F 210 may include a layer 2 interface that receives the incoming data unit from input port 205 and dynamically creates subscriber interfaces for each subscriber for processing subscriber data units. Demux table 215 may store source identifiers retrieved from subscriber packets, and may associate pointers to subscriber interfaces that will process data units containing a corresponding source identifier. In some embodiments, demux table 215 may additionally include a security parameter, that corresponds to each source identifier, for establishing a virtual private network (VPN) with an associated subscriber.

Subscriber interfaces 220 may process data units of corresponding subscribers according to session attributes received from RADIUS server 120. Application 225 may include functionality for routing and forwarding data units towards an intended destination. Subscriber database 230 may store usernames and passwords associated with each network service subscriber. RADIUS server 120 may authenticate each subscriber and provide session attributes that correspond to a class, or multiple classes, associated with each subscriber (differentiated services being associated with each class of the multiple classes). DHCP server 115 may assign source identifiers (e.g., IP addresses) to subscribers. DCM 125 may control the dynamic configuration of subscriber I/Fs 220 based on requests from application 225.

The components of ERX 105 described above may each consist of software, hardware, firmware, or some combination of software, hardware or firmware.

Exemplary Demux Table

Figure 3:
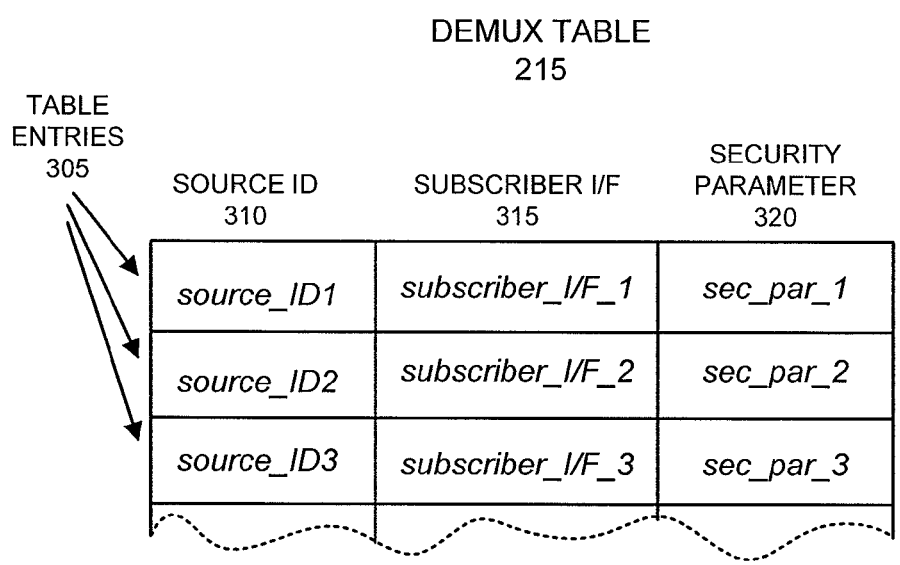
FIG. 3 is a diagram of an exemplary demultiplexing table consistent with the principles of the invention.

FIG. 3 illustrates an exemplary demux table 215 consistent with the principles of the invention. Demux table 215 may include one or more table entries 305, each of which may include a source identifier 310, a subscriber I/F pointer 315 and a security parameter 320. Source identifier 310 may include a source address associated with a given subscriber. Subscriber I/F pointer 315 may include a pointer to one of subscriber interfaces 220-1 through 220-N that corresponds to a given subscriber. Optional security parameter 320 may include, for example, a security parameters index (SPI) that enables ERX 105 to select a security association under which a data unit received from a given subscriber will be processed. The security parameter 320, thus, may be used to create a virtual private network (VPN) for sending and receiving data units to and from a subscriber.

Exemplary Data Unit

Figure 4:
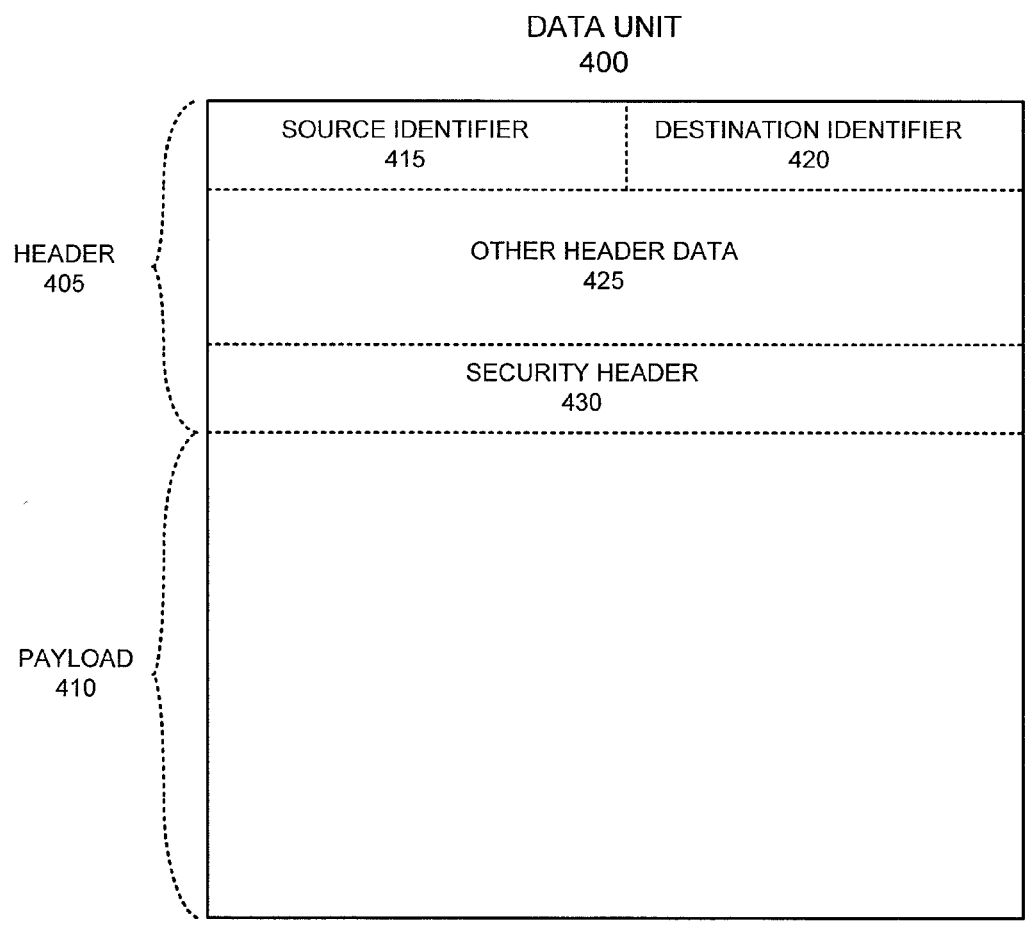
FIG. 4 is a diagram of an exemplary data unit consistent with the principles of the invention.
Figure 5:
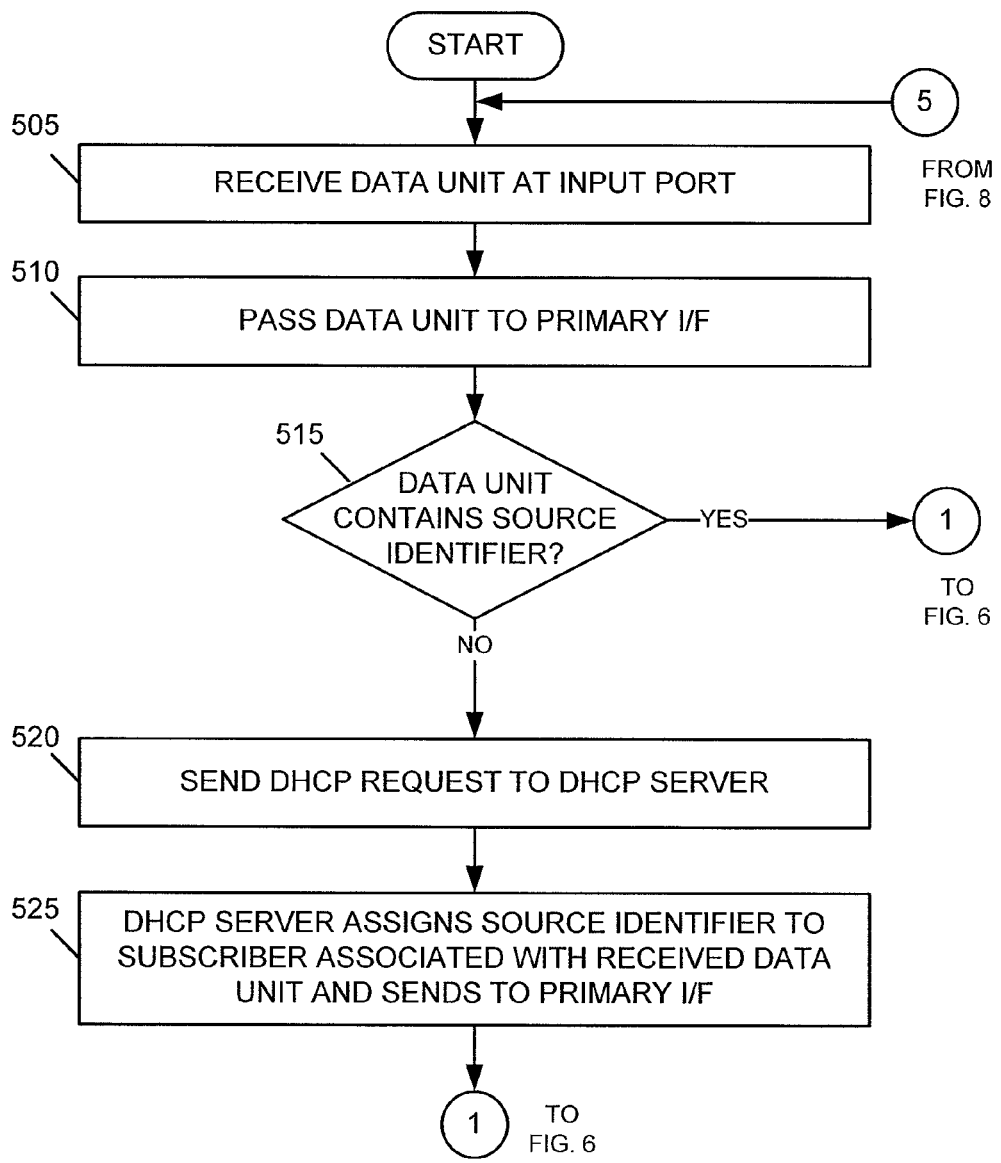
FIGS. 5-8 are flowcharts of an exemplary dynamic subscriber interface configuration process according to an implementation consistent with principles of the invention.
Figure 6:
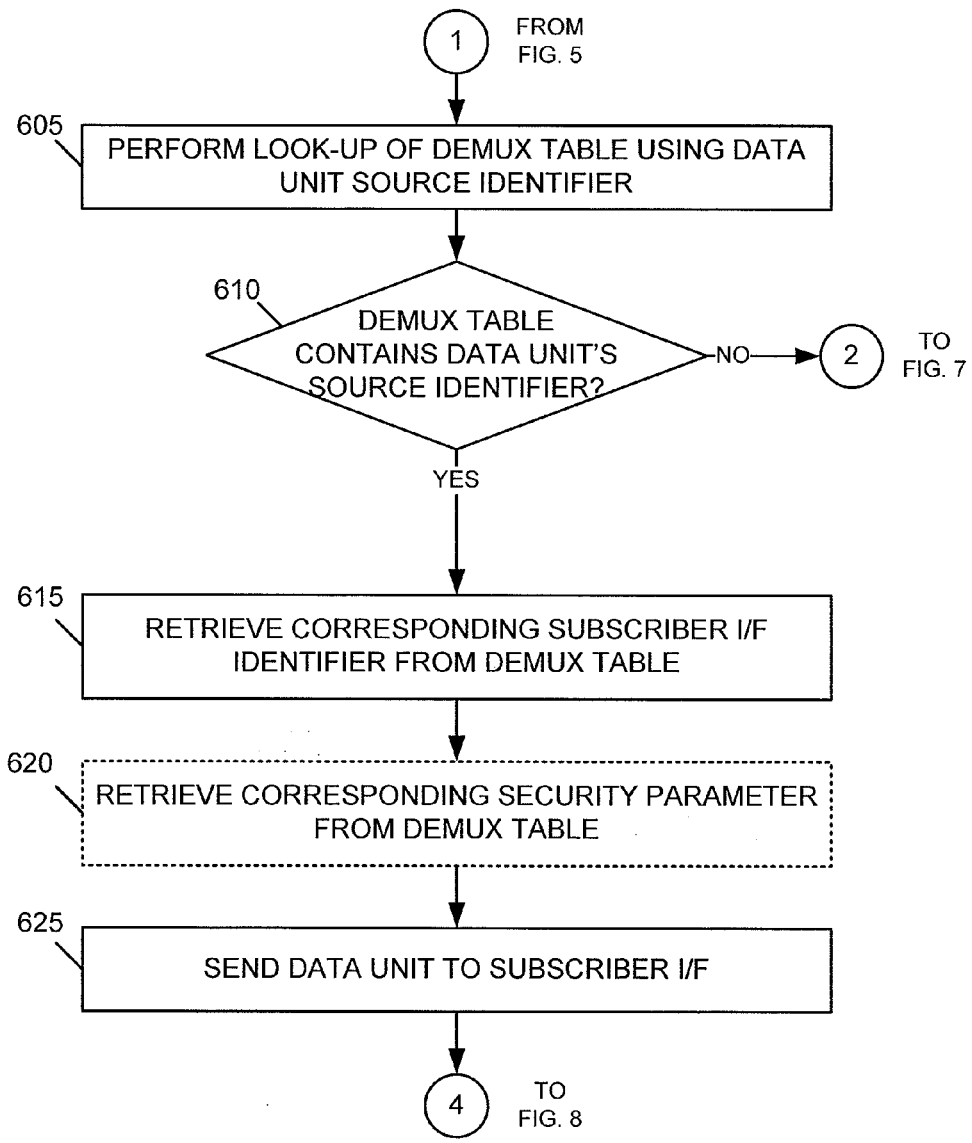
Figure 7:
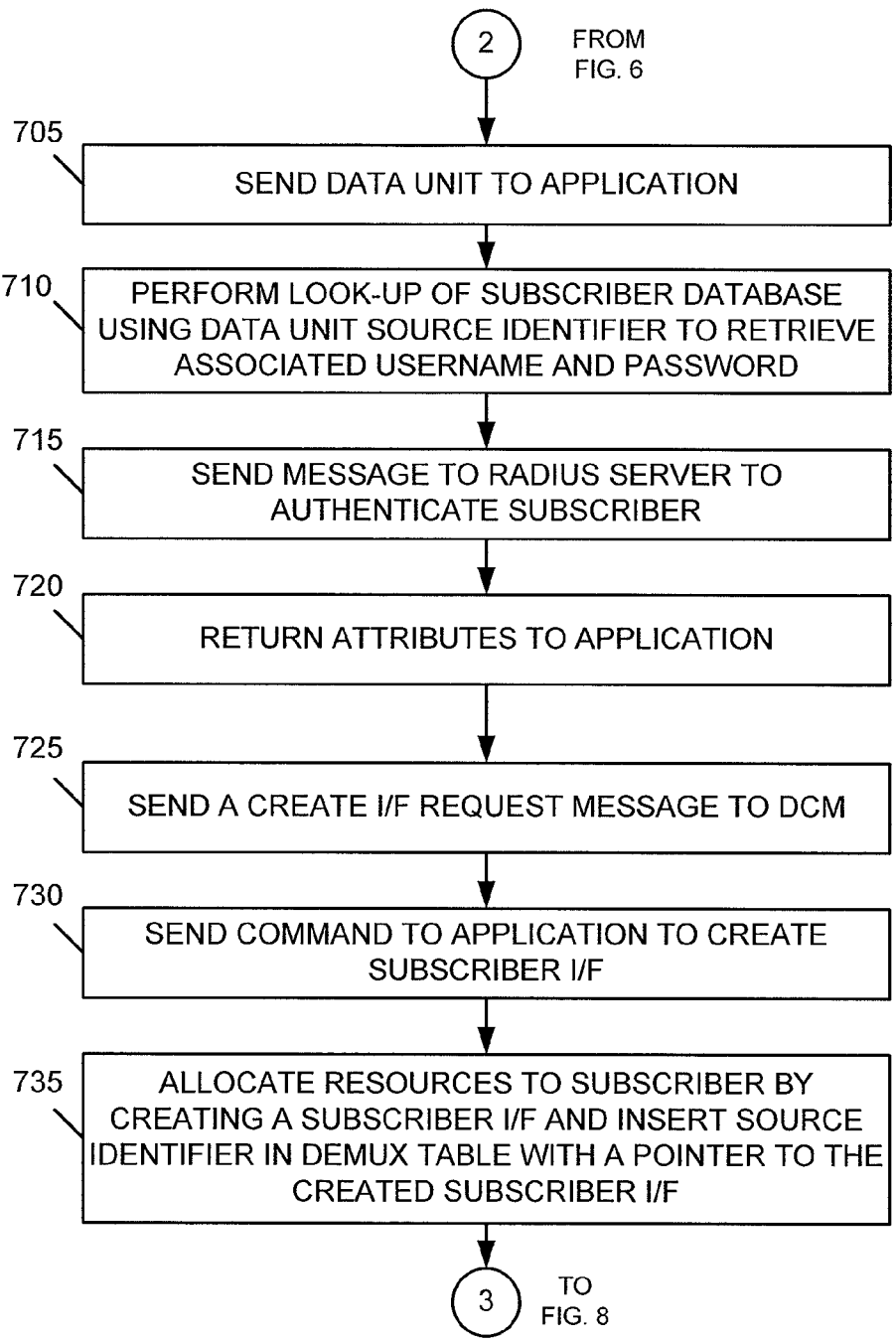
Figure 8:
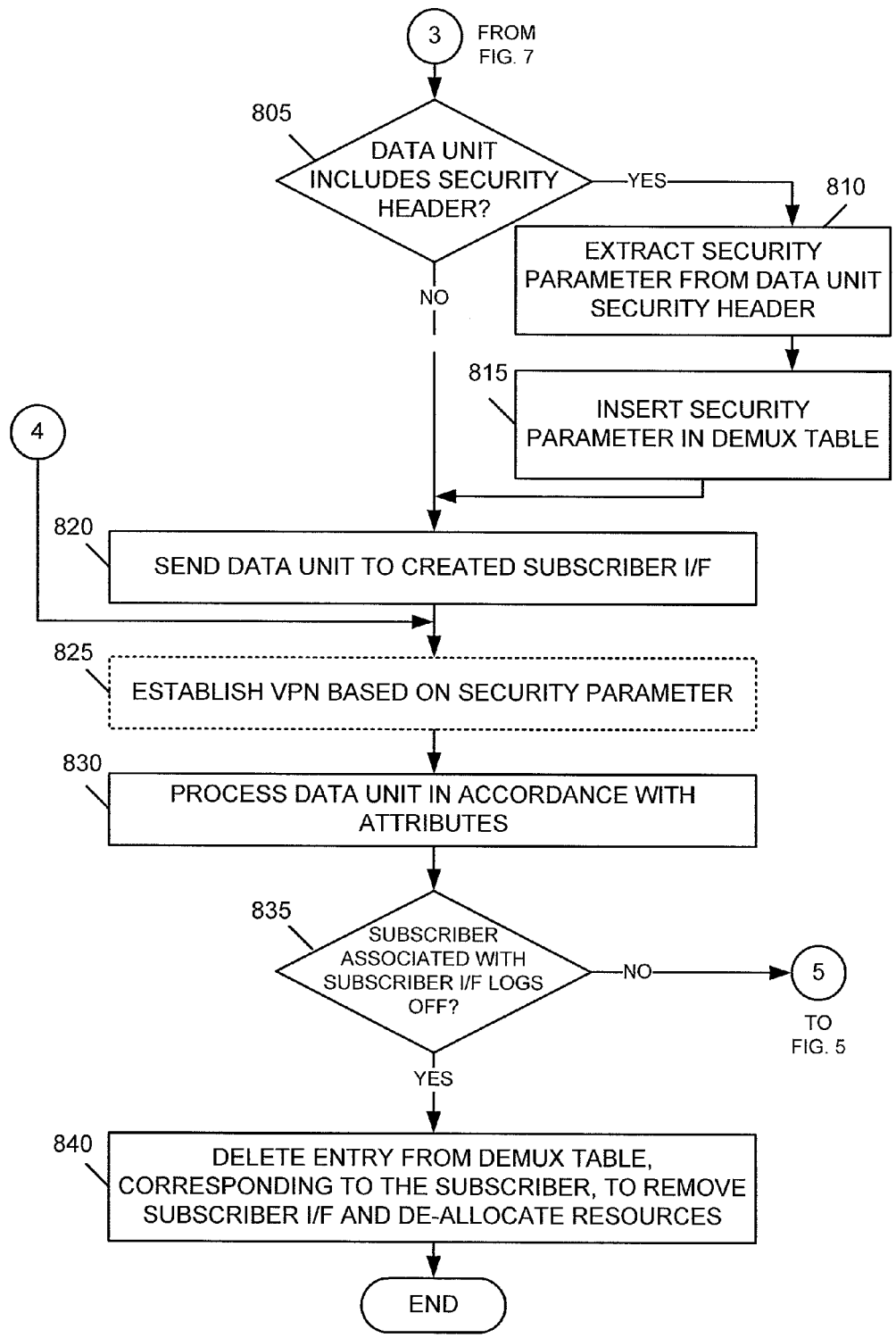

FIG. 4 illustrates an exemplary data unit 400 consistent with the principles of the invention. Data unit 400 may include a header 405 and a payload 410. Header 405 may include a source identifier 415, a destination identifier 420, other header data 425, and a security header 430. Payload 410 may include the data payload of data unit 400.

Source identifier 415 may include one or more network addresses associated with the subscriber that originated the data unit. Such network addresses may include, for example, IP addresses and/or Media Access Control (MAC) addresses. Destination identifier 420 may include one or more network addresses associated with the destination of the data unit. Other header data 425 may include data used in the routing of data units from source to destination. Such data may include, for example, error checking data (e.g., checksums), sequence numbers, time-to-live values, etc. Security header 430 may include various data associated with secure transmission of data between a source and destination. Such data may include various values used in IP security (IPsec) protocol, such as a security parameters index (SPI) used in selecting a security association under which a data unit 400 may be processed when received.

Exemplary Dynamic Subscriber

Interface Configuration Process

FIGS. 5-8 are flowcharts that illustrate an exemplary process, consistent with the principles of the invention, for dynamically configuring subscriber interfaces in ERX 105. The exemplary process of FIGS. 5-8 may be implemented in software, hardware or firmware in ERX 105, or in any combination of software, hardware or firmware.

The exemplary process may begin with the receipt of a data unit 400 at input port 205 of ERX 105 [act 505]. Input port 205 may pass the received data unit 400 to primary I/F 210

[act 510]. Primary I/F 210 may determine whether the received data unit 400 contains a value in the source identifier field 415 [act 515]. If so, the exemplary process may continue at act 605 below. If the received data unit 400 does not contain a value in the source identifier field 415 (i.e., field is set to zero), then primary I/F 210 may send a DHCP request message to DHCP server 115 [act 520]. Responsive to receipt of the DHCP request message, DHCP server 115 may assign a source identifier to the subscriber associated with the received data unit 400 and send the source identifier to primary I/F 210 [act 525]. Primary I/F 210 may then perform a look-up of demux table 215 using the data unit source identifier [act 605]. The look-up may include matching the data unit source identifier with a value in the source identifier field 310 of any of the entries 305 of demux table 215. Primary I/F 210 may determine, based on the look-up of demux table 215, whether any entries 305 of demux table 215 contain the data unit's source identifier (i.e., any source identifier fields 310 of demux table 215 match the data unit's source identifier) [act 610]. If not, then data unit 400 may be sent to application 225 [act 705]. Application 225 may perform a look-up of subscriber database 230, using the data unit's source identifier, to retrieve a username and password associated with the subscriber [act 710]. Application 225 may then send a message, containing the username and password, to RADIUS server 120 to authenticate the subscriber [act 715].

After authenticating the subscriber, RADIUS server 120 may return attributes that define the service to be given to the subscriber [act 720]. Application 225, upon receipt of the attributes, may send a create I/F request message to DCM 125 [act 725]. DCM 125, upon receipt of the create I/F request message, may send a command to application 225 to create a subscriber I/F 220 [act 730]. Application 225, upon receipt of the command from DCM 125, may allocate ERX 105 resources to the subscriber by creating a subscriber I/F 220 and inserting the data unit's source identifier in the source ID field 310 of demux table 215 with a pointer to the created subscriber I/F 220 [act 735].

Application 225 may then determine whether data unit 400 includes a security header 430 [act 805]. If so, application 225 may extract a security parameter from data unit 400 security header 430 [act 810]. The security parameter may include, for example, a security parameters index (SPI). Application 225 may then insert the extracted security parameter in the security parameter field 320 of demux table 215 [act 815]. Application 225 may send data unit 400 to the created subscriber I/F [act 820]. The exemplary process may then continue at act 825 below.

Returning to act 610, if an entry 305 of demux table 215 contains the data unit's source identifier, then the corresponding subscriber I/F pointer 315 may be retrieved from the entry 305 of demux table 215 [act 615]. The corresponding security parameter 320 may, optionally, also be retrieved from the entry 305 of demux table 215 [act 620]. The received data unit 400 may then be sent to the subscriber I/F corresponding to the pointer in subscriber I/F field 315 of demux table 215 [act 625]. A virtual private network (VPN) may optionally be established using security parameter 320 from demux table 215 [act 825]. Security parameter 320 may include a security parameters index (SPI) used in selecting a security association that is operative in establishing the VPN. Data unit 400 may be processed in accordance with the attributes, received from RADIUS server 120, associated with the subscriber I/F 220 [act 830].

A determination may be made whether any subscriber associated with any of the created subscriber I/Fs 220 has logged off [act 835]. If so, primary I/F 210 may delete an entry 305, corresponding to the subscriber, from demux table 215 to remove the associated subscriber I/F 220, thus, de-allocating resources. If no subscribers associated with any of the created subscriber interfaces 220 have logged off, the exemplary process may return to act 505 above.

CONCLUSION

Consistent with the principles of the invention, dynamic subscriber interfaces are provided that allocate network resources so as to provide differentiated services to the different subscribers of a network service. A primary interface, consistent with the principles of the invention, may create dynamic subscriber interfaces that may be removed, thus, de-allocating resources, when a corresponding subscriber logs off of the network service.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While series of acts have been described in FIGS. 5-8, the order of the acts may vary in other implementations consistent with the present invention. Also, non-dependent acts may be performed in parallel. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   extracting, by a processor of a network device, information from headers of data units received from a plurality of subscribers;
   using, by the processor, the extracted information to retrieve, from a look up table in the network device, pointers to subscriber interfaces, in the network device, that correspond to the extracted information;
   sending, by the processor, the data units to the subscriber interfaces;
   dynamically configuring, by the processor, the subscriber interfaces to allocate network device resources to the plurality of subscribers; and
   deleting, by the processor and from the look up table, an entry corresponding to a particular subscriber interface, of the subscriber interfaces, when a particular subscriber, of the plurality of subscribers, logs off.

2. The method of claim 1, where each of the subscriber interfaces provides differentiated services for the plurality of subscribers.

3. The method of claim 1, where the information comprises at least one of Internet Protocol (IP) addresses or Media Access Control (MAC) addresses associated with the plurality of subscribers.

4. The method of claim 1, further comprising:
   retrieving security parameters corresponding to the pointers to the subscriber interfaces, from the look up table.

5. The method of claim 4, further comprising:
   establishing a virtual private network using the retrieved security parameters.

6. The method of claim 1, where deleting the entry includes:
   de-allocating the particular subscriber interface when the particular subscriber logs off.

7. A device comprising:
a processor to:
extract first data identifying a source of a data unit, the data unit being received from a subscriber;
retrieve, from a look up table and based on the first data, second data indicating a pointer to a subscriber interface associated with the source of the data unit;
send the data unit to the subscriber interface;
dynamically configure the subscriber interface to allocate a resource, of the device, to the subscriber; and
delete, from the look up table, an entry corresponding to the subscriber interface when the subscriber logs off.

8. The device of claim 7, where the subscriber interface provides a differentiated service to the source of the data unit.

9. The device of claim 7, where the processor is further to:
retrieve, from the look up table, third data indicating a security parameter associated with providing a secure connection to the source of the data unit; and
establish the secure connection based on the security parameter.

10. The device of claim 7, where, when extracting the first data, the processor is to:
extract the first data from a header of the data unit.

11. The device of claim 7, where the first data comprises at least one of an Internet Protocol (IP) address or a Media Access Control (MAC) address associated with the source of the data unit.

12. A system comprising:
a network device including:
an input port to receive a data unit; and
an interface to:
when the data unit includes information associated with a source identifier and the source identifier is not included in a table associated with the network device:
create a subscriber interface, within the network device, to allocate resources, of the network device to a subscriber of a network service, and
delete, from the table, an entry corresponding to the subscriber interface to de-allocate the resources from the subscriber when the subscriber logs off of the network service, and when the data unit includes the information associated with the source identifier and the source identifier is included in the table:
use the information to retrieve, from the table, a pointer to another subscriber interface in the network device,
send the data unit to the other subscriber interface, and
dynamically configure the other subscriber interface to allocate the resources to the subscriber.

13. The system of claim 12, where the source identifier includes at least one of an Internet Protocol (IP) address or a Media Access Control (MAC) address.

14. The system of claim 12, where the network device includes an edge router.

15. The system of claim 12, where the interface is further to:
insert the source identifier into the table with a pointer to the created subscriber interface to create the entry.

16. The system of claim 15, where, when deleting the entry, the interface is to:
remove the source identifier from the table when the subscriber logs off.

17. The system of claim 12, where the subscriber interface provides a differentiated network service to the network service subscriber.

18. The system of claim 12, where a security protocol parameter is associated with the created subscriber interface, and
where the interface is further to:
establish a virtual private network using the security protocol parameter.

19. The system of claim 12, where the information is extracted from a header of the data unit.

20. The system of claim 12, where the interface is further to:
determine the information associated with the source identifier based on information included in a header of the data unit.

* * * * *